United States Patent
Tokunaga

(10) Patent No.: US 12,059,906 B2
(45) Date of Patent: Aug. 13, 2024

(54) METHOD AND MECHANISM OF ATTACHING READERS, AND IMAGE READING DEVICE

(71) Applicant: Yusuke Tokunaga, Kanagawa (JP)

(72) Inventor: Yusuke Tokunaga, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 161 days.

(21) Appl. No.: 17/938,954

(22) Filed: Sep. 7, 2022

(65) Prior Publication Data
US 2023/0095023 A1 Mar. 30, 2023

(30) Foreign Application Priority Data
Sep. 27, 2021 (JP) .................................. 2021-157242

(51) Int. Cl.
*B41J 29/393* (2006.01)
*B41J 25/00* (2006.01)

(52) U.S. Cl.
CPC ............. *B41J 25/00* (2013.01); *B41J 29/393* (2013.01); *B41J 2025/008* (2013.01)

(58) Field of Classification Search
CPC ............. H04N 1/00557; H04N 1/0464; H04N 1/00543; B41J 29/393; B41J 2/2142; B41J 2203/01; G01N 33/34; G01N 33/343; G01N 33/346; G01N 2021/8663
See application file for complete search history.

(56) References Cited

FOREIGN PATENT DOCUMENTS

| JP | 2015-119388 | 6/2015 |
|---|---|---|
| JP | 2016-198899 | 12/2016 |

OTHER PUBLICATIONS

U.S. Appl. No. 17/848,412, filed Jun. 24, 2022, Taiki Yamamoto, et al.

*Primary Examiner* — Julian D Huffman
(74) *Attorney, Agent, or Firm* — XSENSUS LLP

(57) ABSTRACT

An image reading device includes a plurality of readers, an access opening, and a lift. The plurality of readers read an image on a recording medium. The plurality of readers are arranged around a carrier to rotate while carrying the recording medium on a peripheral surface of the carrier. The plurality of readers are arranged radially about a rotation axis of the carrier. The plurality of readers are to be introduced through the access opening. The lift includes a cable to lift one reader of the plurality of readers introduced through the access opening. The lift lifts and locates the one reader at a predetermined height position around the carrier with the cable.

12 Claims, 9 Drawing Sheets

METHOD AND MECHANISM OF ATTACHING READERS, AND IMAGE READING DEVICE

CROSS-REFERENCE TO RELATED APPLICATION

This patent application is based on and claims priority pursuant to 35 U.S.C. § 119(a) to Japanese Patent Application No. 2021-157242, filed on Sep. 27, 2021, in the Japan Patent Office, the entire disclosure of which is incorporated by reference herein.

BACKGROUND

Technical Field

Embodiments of the present disclosure relate to a method and a mechanism of attaching readers, and an image reading device.

Discussion of the Background Art

An inkjet recording apparatus includes, for example, a plurality of droplet discharge units that discharge ink of different colors such as cyan (C), magenta (M), yellow (Y), and black (K) around a rotary drum that conveys a recording medium. Around the rotary drum, an image reading device using an in-line scanner is disposed on the downstream side of these droplet discharge units. This image reading device inspects an image formed on the recording medium for uneven densities and an unacceptable ink discharge state, and optimally adjusts the ink discharge state and the like in accordance with the result of the inspection.

An integrated scanner that is continuous in the width direction of a recording medium and has a long length (e.g., the width of B2 paper size) is expensive. Therefore, in conventional cases, a plurality of inexpensive scanners having a medium length or a short length (e.g., the width of A3 paper size) is arranged to be staggered at intervals of two or three or more scanners (e.g., in a staggered layout) in the conveying direction of the rotary drum. The images read by the plurality of scanners are then combined so that an image of the original without a detective seam is obtained.

SUMMARY

According to an embodiment of the present disclosure, an image reading device includes a plurality of readers, an access opening, and a lift. The plurality of readers read an image on a recording medium. The plurality of readers are arranged around a carrier to rotate while carrying the recording medium on a peripheral surface of the carrier. The plurality of readers are arranged radially about a rotation axis of the carrier. The plurality of readers are to be introduced through the access opening. The lift includes a cable to lift one reader of the plurality of readers introduced through the access opening. The lift lifts and locates the one reader at a predetermined height position around the carrier with the cable.

According to another embodiment of the present disclosure, there is provided a mechanism of attaching a reader in an image reading device in which a plurality of readers to read an image on a recording medium are arranged around a carrier to convey the recording medium while holding the recording medium on a peripheral surface of the carrier. The plurality of readers are arranged radially about a rotation axis of the carrier. The mechanism includes an access opening and a lift. The plurality of readers are to be introduced through the access opening to set the plurality of readers at predetermined positions around the carrier. The lift includes a first cable portion and a second cable portion. The first cable portion has a first shaft to engage with one end of one reader of the plurality of readers introduced through the access opening. The second cable portion has a second shaft to engage with another end of the one reader introduced through the access opening. The other end is farther from the carrier than the one end is. The lift lifts and locates the one reader at a predetermined position around the carrier, with the first cable portion and the second cable portion.

According to still another embodiment of the present disclosure, there is provided a method of attaching a reader in an image reading device in which a plurality of readers to read an image on a recording medium are arranged around a carrier to convey the recording medium while holding the recording medium on a peripheral surface of the carrier. The plurality of readers are arranged radially about a rotation axis of the carrier. The method includes: introducing the plurality of readers through an access opening, to set the plurality of readers at predetermined positions around the carrier; engaging a first shaft of a first cable portion with one end of one reader of the plurality of readers introduced through the access opening; engaging a second shaft of a second cable portion with another end of the one reader introduced through the access opening, said another end being farther from the carrier than the one end is; and winding the first cable portion and the second cable portion with a winder, to lift and locate the one reader at a predetermined position around the carrier.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
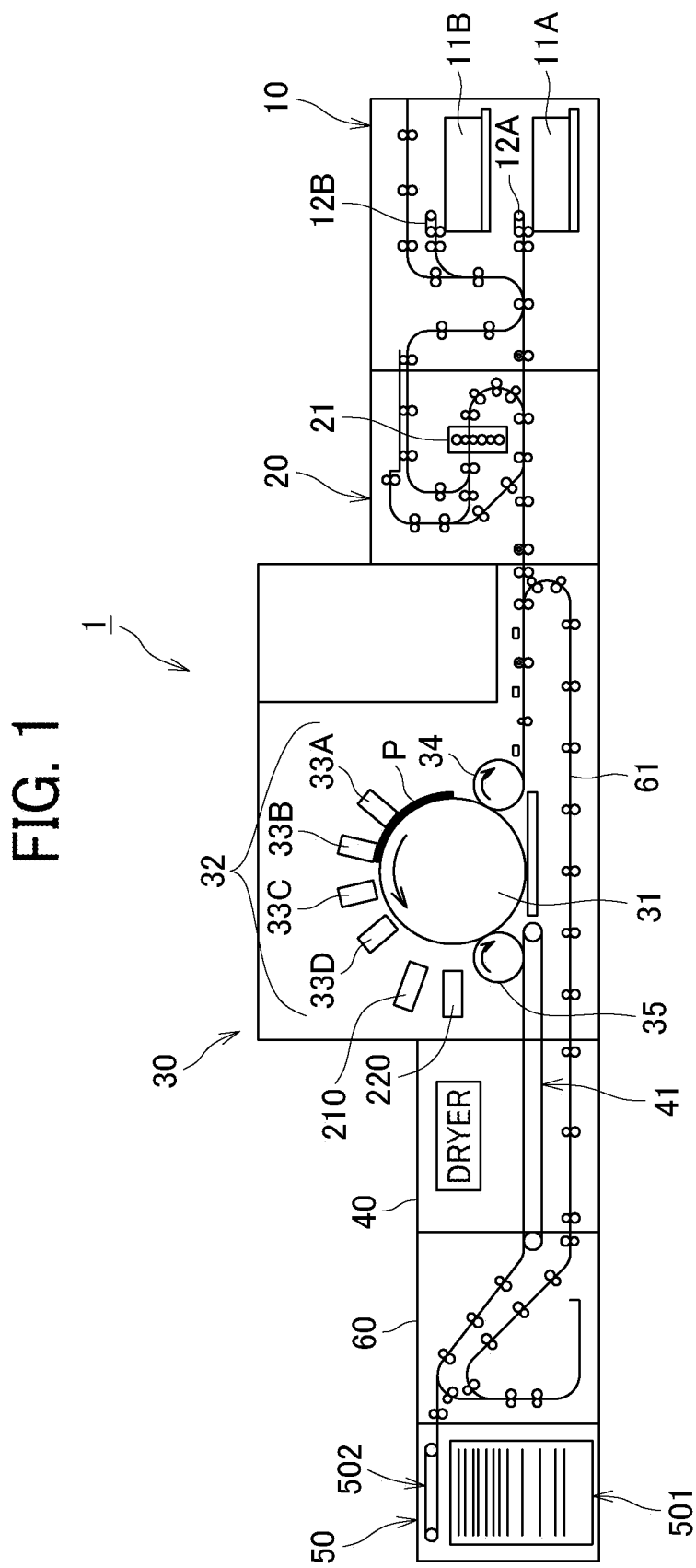
FIG. 1 is a schematic view of an inkjet recording apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Inkjet Recording Apparatus

The following is a description of an embodiment of the present disclosure, with reference to the accompanying drawings. FIG. 1 is a schematic view of an inkjet recording apparatus 1 as a liquid discharge apparatus. The inkjet recording apparatus 1 includes a feeder 10 that introduces a paper sheet P as an application target (a recording medium) to which a liquid is to be applied, a pretreatment device 20, a printer 30, a dryer 40, a sheet receiver 50, and a reversing mechanism 60.

The inkjet recording apparatus 1 gives (applies) a pretreatment liquid to the paper sheet P conveyed (supplied) from the feeder 10 with the pretreatment device 20 as necessary, and applies a liquid with the printer 30, to perform required printing. After drying the liquid adhering to the paper sheet P with the dryer 40, the inkjet recording apparatus 1 discharges the paper sheet P to the sheet receiver 50.

The feeder 10 includes feed trays (a lower feed tray 11A and an upper feed tray 11B) that stores a plurality of paper sheets P, and feeding devices 12A and 12B that separate and feed the paper sheets P one by one from the feed trays, to supply the paper sheets P to the pretreatment device 20.

The pretreatment device 20 includes an applicator 21 that is a treatment liquid applicator that aggregates the coloring material of the ink, for example, and applies a treatment liquid having the effect of preventing the ink from bleeding through the paper, onto the printing surface of the paper sheet P.

The printer 30 includes a rotary drum 31 that is a carrier (a rotating member) that carries the paper sheet P on its peripheral surface and rotates, and a droplet discharger 32 that discharges a liquid toward the paper sheet P being carried by the rotary drum 31.

The printer 30 also includes a transfer cylinder 34 that receives the paper sheet P sent from the pretreatment device 20 and transfers the paper sheet P to the rotary drum 31, and a transfer cylinder 35 that receives the paper sheet P conveyed by the rotary drum 31 and transfers the paper sheet P to the dryer 40.

The paper sheet P conveyed from the pretreatment device 20 to the printer 30 is gripped at the top edge by a gripper (a sheet gripper) provided on the transfer cylinder 34, and is conveyed as the transfer cylinder 34 rotates. The paper sheet P conveyed by the transfer cylinder 34 is transferred to the rotary drum 31 at a position where the paper sheet P faces the rotary drum 31.

A gripper (a sheet gripper) is also provided on the surface of the rotary drum 31, and the paper sheet P is gripped at the top edge by the gripper (sheet gripper). A plurality of suction holes is dispersedly formed in the surface of the rotary drum 31, and a suction airflow directed inward from predetermined suction holes of the rotary drum 31 is generated by a suction means.

The paper sheet P transferred from the transfer cylinder 34 to the rotary drum 31 is then gripped at the top edge by the sheet gripper, and is sucked and carried on the rotary drum 31 by the suction airflow generated by the suction means. The paper sheet P is further conveyed as the rotary drum 31 rotates.

The droplet discharger 32 includes four droplet discharge units 33A to 33D that discharge droplets. These droplet discharge units 33A to 33D are disposed at equal intervals and symmetrically in FIG. 1 along the outer periphery of the rotary drum 31 in an area above the rotary drum 31.

The droplet discharge unit 33A can discharge a cyan (C) liquid, the droplet discharge unit 33B can discharge a magenta (M) liquid, the droplet discharge unit 33C can discharge a yellow (Y) liquid, and the droplet discharge unit 33D can discharge a black (K) liquid. It is also possible to use a droplet discharge unit that discharges a special liquid such as a white or gold (silver) liquid.

A discharge operation of each of the droplet discharge units 33A to 33D of the droplet discharger 32 is controlled by a drive signal corresponding to print information. When the paper sheet P carried on the rotary drum 31 passes through the region facing the droplet discharger 32, the liquids of the respective colors are discharged from the discharge units 33, and an image corresponding to the print information is printed.

The paper sheet P onto which the liquids have been applied by the droplet discharger 32 is transferred from the rotary drum 31 to the transfer cylinder 35, and the paper sheet P received by the transfer cylinder 35 is then transferred to a conveyance mechanism 41 and is conveyed to the dryer 40 serving as a heater.

The dryer 40 dries the liquids that have been applied onto the paper sheet P by the printer 30. As a result, the liquid component such as moisture in the liquids evaporates, and the colorants contained in the liquids are fixed onto the paper sheet P. Also, curling of the paper sheet P is prevented.

The reversing mechanism 60 is a mechanism that reverses the paper sheet P in a switchback manner when double-sided printing is performed on the paper sheet P that has passed through the dryer 40. The reversed paper sheet P is reversely sent to the upstream side of the transfer cylinder 34 through a conveyance path 61 in the printer 30.

The sheet receiver 50 includes a sheet catch tray 51 on which a plurality of paper sheets P is stacked, and a sheet conveyance device 502. The paper sheets P conveyed through the reversing mechanism 60 are sequentially stacked and stored in a stacker 501.

Printer

Figure 2A:
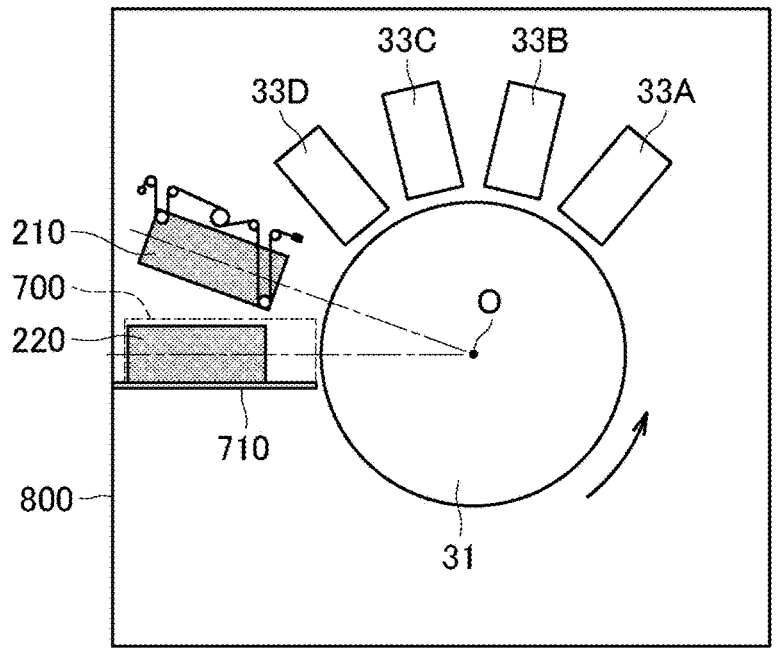
FIG. 2A is an enlarged view of a printer.
Figure 2B:
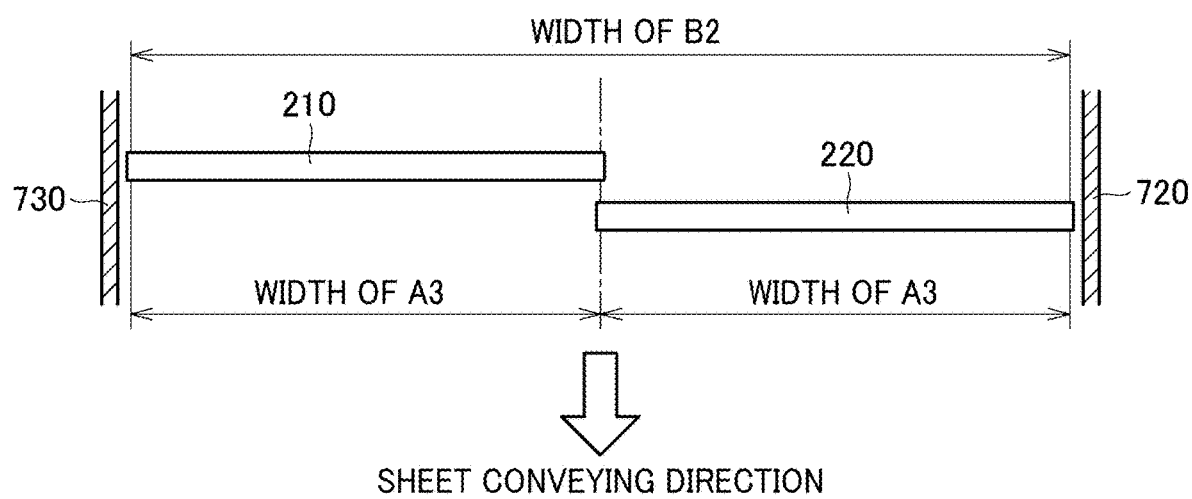
FIG. 2B is a plan view of a reading device.

Next, the printer 30 is described. FIG. 2A is an enlarged view of the printer 30 illustrated in FIG. 1. FIG. 2B is a plan view of an image reading device disposed on the downstream side of the droplet discharger 32 of the printer 30 in the sheet conveying direction as viewed from the outer periphery of the rotary drum.

The droplet discharger 32 includes the four droplet discharge units 33A to 33D that discharge inks of four colors (C, M, Y, and K). Each of the droplet discharge units 33A to 33D is formed with a plurality of heads that discharge a liquid and are arranged in a staggered manner on a head attachment member. Alternatively, one row of heads, instead of heads arranged in a staggered manner, may be disposed on a head attachment member.

Two scanners 210 and 220 as the readers of the image reading device are disposed on the downstream side of the droplet discharger 32 in the sheet conveying direction. The axial extension lines of the scanners 210 and 220 extend toward the center O of the rotary drum 31. Accordingly, the scanners 210 and 220 are arranged radially about the rotation axis of the rotary drum 31 and equidistantly from the peripheral surface of the rotary drum 31. It is also possible to adopt three or more scanners.

The scanner 210 on the upstream side in the conveying direction is disposed at an angle of about 30 degrees with respect to a horizontal line. On the other hand, the scanner 220 on the downstream side in the conveying direction is disposed horizontally. The two scanners 210 and 220 each include a line sensor that reads an image recorded on a paper sheet P line by line, an imaging forming lens, and a plurality of lightings.

The scanners 210 and 220 each inspect uneven density of the image formed on the paper sheet P and the quality of the ink discharge state, and optimally adjust the ink discharge state and the like in accordance with the inspection results. The image inspection is performed on the basis of a result of printing of a predetermined test chart on the paper sheet P.

In this embodiment, the scanners 210 and 220 have the relatively short width of A3 paper size, which is advantageous in terms of cost, as illustrated in FIG. 2B, and are arranged to deviate from each other in the sheet conveying direction. The two scanners 210 and 220 partially overlap with each other in the sheet conveying direction at the center portion of the rotary drum 31 in the axial direction. Combining the images obtained from the two scanners 210 and 220 enables image reading of a maximum of the width of B2 paper size. In a case where three or more scanners are adopted, combining images obtained from the scanners enables image reading of the width of B2 paper size or greater.

Scanner Lift

In the related art, for example, scanners are disposed interchangeably through an access opening formed on the front side of the machine. However, if an access opening is formed for each scanner, the total opening area increases, and the machine increases in size. To deal with this disadvantage, the number of access openings might be made smaller than the number of scanners, or each access opening might be made smaller in size. In such cases, however, the workability in replacing the scanners may be poor.

In the present embodiment, as illustrated in FIG. 2A, the mechanism of lifting up the upstream scanner 210 is disposed immediately above the scanner 210. With this lift, the upstream scanner 210 introduced through an access opening 700 is lifted up to a predetermined height position illustrated in FIG. 2A. The access opening 700 is shared with the downstream scanner 220, to miniaturize the device.

As illustrated in FIG. 2A, the access opening 700 can be formed on the front surface side of the housing 800 of the rotary drum 31 at substantially the same height as the center O of the rotary drum 31. The access opening 700 is formed further on the downstream side of the most downstream droplet discharge unit 33D, and is open in the same direction as the axial direction of the rotary drum 31 (the front side in FIG. 2A).

The access opening 700 can be formed in a horizontally long rectangular shape with the minimum necessary size with which the scanners 210 and 220 can be introduced. However, to facilitate the work when a first lifting shaft 3001 and a second lifting shaft 3002 are engaged with the four corners (cutout grooves 3003 and 3004) of the scanner 210 as described later, it is desirable to form an opening slightly larger than the scanner 210.

Figure 3A:
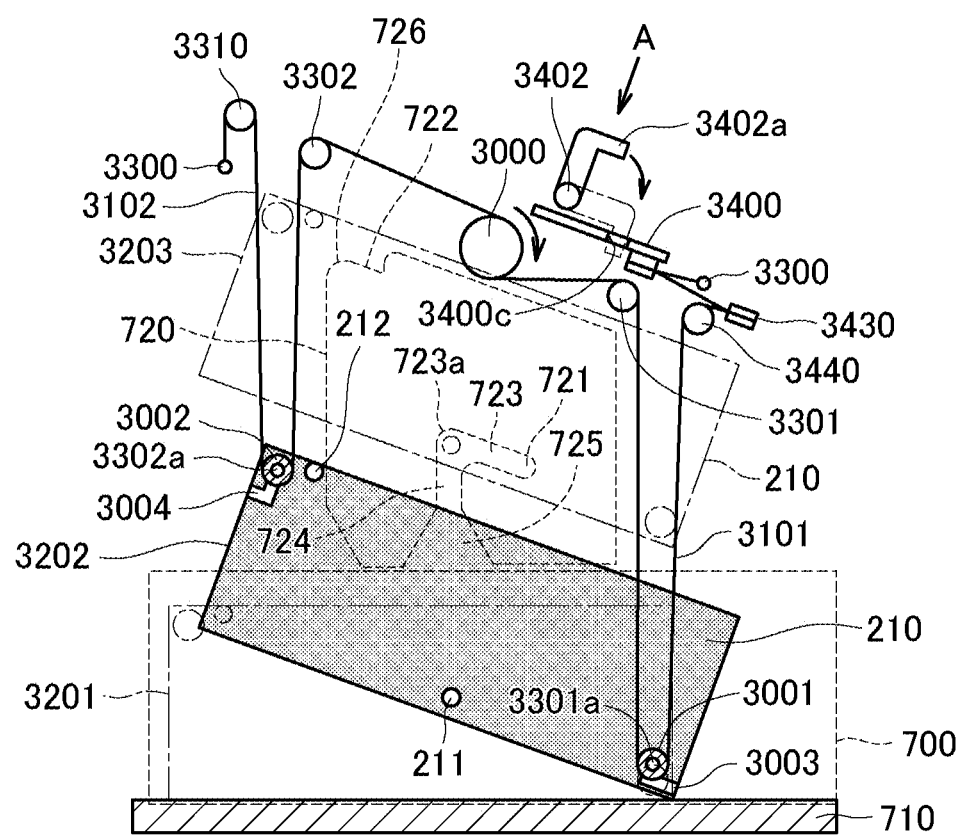
FIG. 3A is a side view of a scanner lift.
Figure 3B:
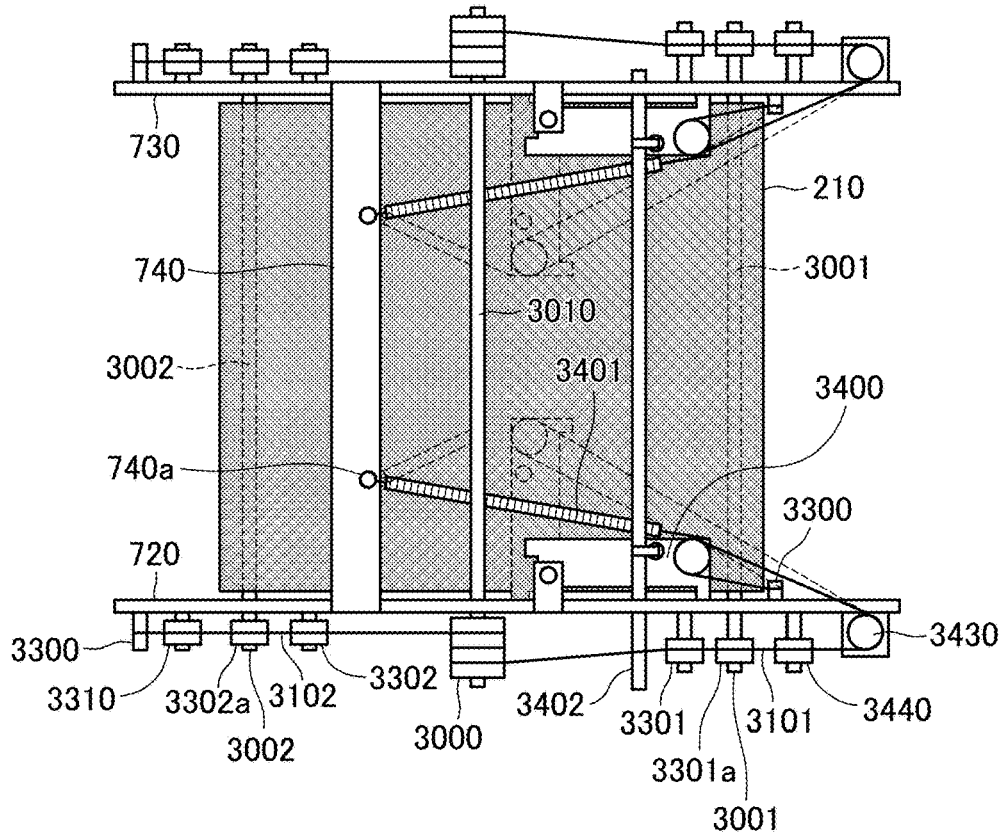
FIG. 3B is a plan view of the scanner lift of FIG. 3A.

As illustrated in FIGS. 3A and 3B, the lift includes a first wire 3101 as a first cable portion and a second wire 3102 as a second cable portion. The first wire 3101 is disposed closer to the rotary drum, and the second wire is disposed farther from the rotary drum. The lift basically has a vertically symmetrical structure as illustrated in FIG. 3B.

As illustrated in FIG. 3B, the first wire 3101 and the second wire 3102 are disposed in a pair with respect to the axial direction of the rotary drum 31. The rectangular parallelepiped scanner 210 are supported at the four corners by the pair of the first wire 3101 and the second wire 3102, and the scanner 210 is lifted up to the predetermined height. As the scanner 210 are supported at the four corners by the first wire 3101 and the second wire 3102, the lifted posture of the scanner 210 can be stabilized.

Figure 4A:
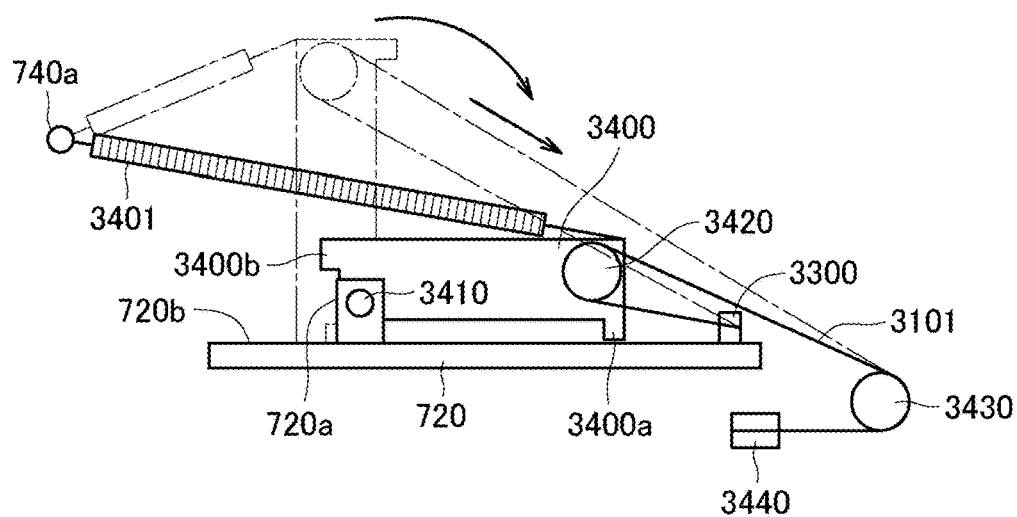
FIG. 4A is a schematic view of a tensioner of the lift.
Figure 4B:
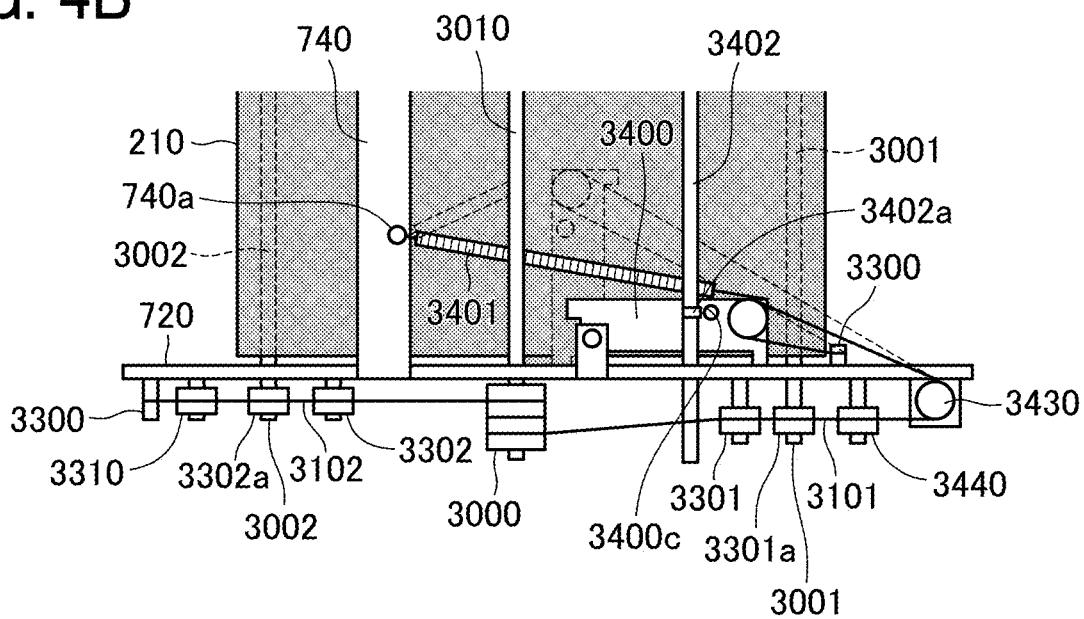
FIG. 4B is a plan view of the tensioner of FIG. 4A in an unlocked state.
Figure 5:
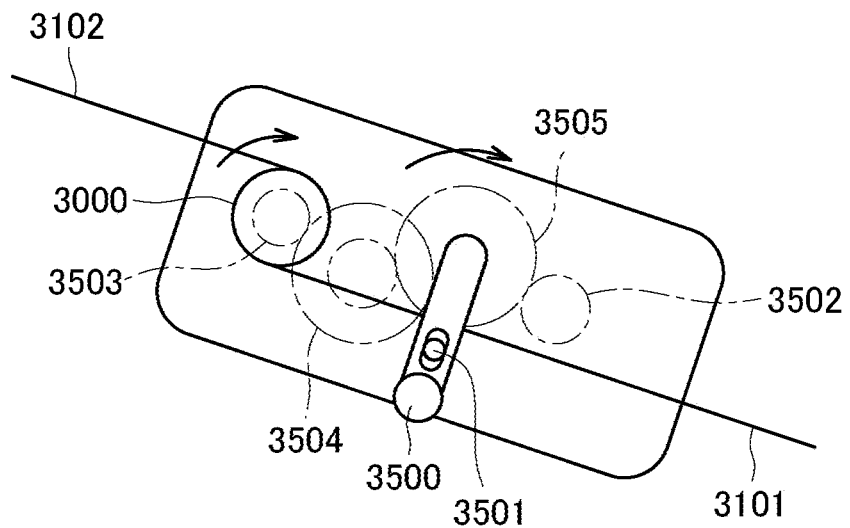
FIG. 5 is a diagram illustrating a winding mechanism.

The lift includes a tensioner 3400 illustrated in detail in FIGS. 4A and 4B, and a winder 3000 illustrated in detail in FIG. 5. The winder 3000 includes a drum-shaped member that simultaneously winds the first wire 3101 on the right side and the second wire 3102 on the left side. The first wire 3101 reeled out from one side of the winder 3000 is pulled downward via an idler pulley 3301, is folded back upward by the first lifting shaft 3001 serving as a first shaft, and is drawn into the tensioner 3400 via another idler pulley 3440.

The second wire 3102 reeled out from the other side of the winder 3000 is pulled downward via an idler pulley 3302. After that, the second wire 3102 is folded back upward by the second lifting shaft 3002 serving as a second shaft, and is fixed to a wire hook 3300 via another idler pulley 3310.

Folding pulleys 3301*a* and 3302*a* are rotatably inserted into the first lifting shaft 3001 and the second lifting shaft 3002. The first wire 3101 and the second wire 3102 are wound in a U-shape around the folding pulleys 3301*a* and 3302*a*.

The L-shaped cutout grooves 3003 and 3004 with which the first lifting shaft 3001 and the second lifting shaft 3002 are to be engaged are formed at the four corners of the scanner 210. The cutout groove 3003 closer to the rotary drum 31 is formed at a position close to the bottom of the scanner 210, and can be engaged with the first lifting shaft 3001. The cutout groove 3004 farther from the rotary drum 31 is formed at a position close to the ceiling of the scanner 210, and can be engaged with the second lifting shaft 3002.

The winder 3000 described later with reference to FIG. 5 is rotated clockwise, so that the first wire 3101 and the second wire 3102 can be simultaneously wound around the winder 3000, and the first lifting shaft 3001 and the second lifting shaft 3002 can be lifted up.

As illustrated in FIGS. 2B, 3A, and 3B, a pair of guide side plates 720 and 730 is disposed on both sides of the scanner 210. The one on the front side of the machine is the front guide side plate 720, and the one on the back side is the back guide side plate 730. These guide side plates 720 and 730 stably maintain the posture of the scanner 210 at the time of lifting.

Note that the positions of the guide side plates 720 and 730 in FIG. 2B are not completely the same as the positions of the guide side plates 720 and 730 in FIG. 3B. That is, the position of the guide side plate 720 in FIG. 3B is closer to the back side than the position of the guide side plate 720 in FIG. 2B. This is because the guide side plate 720 in FIG. 2B is continuous with the guide side plate 720 in FIG. 3B via a horizontal portion (not illustrated) (extending in a vertical direction in FIG. 3B).

The guide side plates 720 and 730 are connected by a connecting plate 740. The connecting plate 740 has a spring fixing portion 740a described later.

The guide side plates 720 and 730 each have cutout portions 721 and 722 for hooking and engaging a total of four engaged pins 211 and 212 that are formed on both side surfaces of the scanner 210. The engaged pins 211 are formed at positions close to the bottom surface at the center of the scanner 210 in the traverse direction. The other engaged pins 212 are formed at upper left end portions of the scanner 210.

The engaged pins 211 are engaged with the cutout portions 721 in the lower portions of the guide side plates 720 and 730. The right side of each cutout portion 721 is closed.

The left side of each cutout portion 721 continues to a sloped groove 723, a vertical groove 724, and a tapered groove 725 that is wider at a lower portion. The portion from each cutout portion 721 to the corresponding tapered groove 725 forms an L shape. When the scanner 210 is introduced and installed, the engaged pins 211 are positioned at predetermined positions in the order of the tapered grooves 725, the vertical grooves 724, the sloped grooves 723, and the cutout portion 721.

The other engaged pins 212 are engaged with the cutout portion 722 at the upper left end of the guide side plate 720 when the scanner 210 is introduced and installed. The right side of the cutout portion 722 is closed at a step. The left side of the cutout portion 722 continues to a sloped portion 726.

Tensioner

Next, the tensioner 3400 is described. The tensioner 3400 is for reducing the amount of slack in the first wire 3101. If the amount of slack in the first wire 3101 is large, the first wire 3101 might be entangled with internal components such as the winder 3000 and the idler pulley 3301, and cause a failure. The tensioner 3400 includes a tension spring 3401 as an elastic member, and reduces the amount of slack in the first wire 3101 with the tension spring 3401.

Specifically, as illustrated in FIG. 4A, a bracket 720a protrudes from and stands on the inside surface 720b of the front guide side plate 720, and the tensioner 3400 is disposed so as to be rotatable about a fulcrum pin 3410 of the bracket 720a.

The tensioner 3400 includes a first protrusion 3400a as a first restrictor on the top edge side thereof, and a second protrusion 3400b on the base end side thereof. One end of the tension spring 3401 is connected to the top edge of the tensioner 3400. The other end of the tension spring 3401 is fixed to the spring fixing portion 740a. A biasing force of the tension spring 3401 brings the second protrusion 3400b of the tensioner 3400 into contact with the inside surface 720b of the front guide side plate 720, so that the tensioner 3400 is held at the position indicated by a dot-and-dash line in FIG. 4A.

An idler pulley 3420 is attached to the top end side of the tensioner 3400. The first wire 3101 is wound around the idler pulley 3420. The end of the first wire 3101 is fixed to a bracket 720a formed on the inside surface 720b of the front guide side plate 720.

After wound around the idler pulley 3420, the first wire 3101 is folded back and is wound around pulleys 3430 and 3440. The first wire 3101 is then wound around the first lifting shaft 3001 described above. After the slack in the first wire 3101 is absorbed by the winder 3000 at the position of the tensioner 3400 indicated by a dot-and-dash line in FIG. 4A, lifting of the scanner 210 is started.

At this point of time, in response to the winding of the first wire 3101 by the winder 3000, the tensioner 3400 rotates clockwise about the fulcrum pin 3410 while stretching the tension spring 3401 as illustrated in FIG. 4A. When the first protrusion 3400a of the tensioner 3400 comes into contact with the inside surface 720b of the front guide side plate 720, the slack absorption by the tensioner 3400 stops, and lifting of the first lifting shaft 3001 (lifting of the right side of the scanner 210) starts.

As illustrated in FIG. 4B, a bar-shaped tensioner lock 3402 can be disposed adjacent to the upper surface of the tensioner 3400. The tensioner lock 3402 is rotatably hung between the front guide side plate 720 and the back guide side plate 730.

Figure 4C:
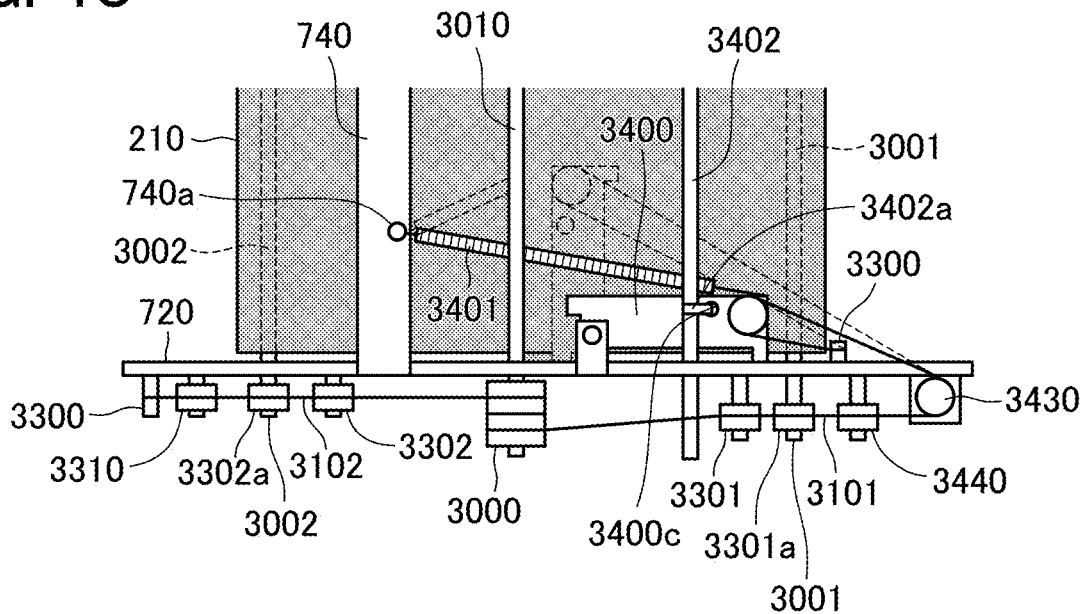
FIG. 4C is a plan view of the tensioner of FIG. 4A in an locked state.
Figure 4D:
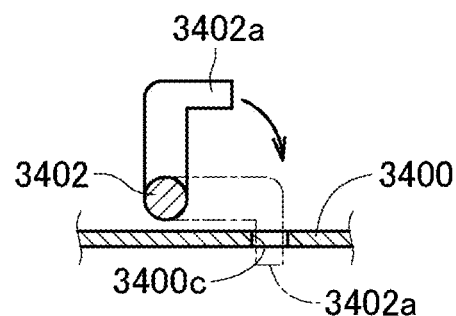
FIG. 4D is a schematic view of a tensioner lock.

An L-shaped lock claw 3402a is provided near either end of the tensioner lock 3402. A through hole 3400c is also formed in the tensioner 3400. The through hole 3400c is formed at a position close to the tensioner lock 3402. When the tensioner lock 3402 rotates to the right as illustrated in FIGS. 4C and 4D, the lock claw 3402a is inserted into the through hole 3400c.

While the lock claw 3402a is in the inserted state, rotation of the tensioner 3400 is locked, and thus, spontaneous lifting of the first lifting shaft 3001 is prevented. Accordingly, as described later with reference to FIGS. 7E and 7F, the operation of engaging the engaged pins 211 and 212 of the scanner 210 with the cutout portions 721 and 722 of the front guide side plate 720 and the back guide side plate 730 can be facilitated.

Winding Mechanism

Next, a winding mechanism of winding the first wire 3101 and the second wire 3102 is described. As illustrated in FIG. 5, this winding mechanism has the drum-shaped winder 3000 including a winding gear 3503 on the substrate. As illustrated in FIG. 3B, the winder 3000 is connected to the winder 3000 on the opposite side by a connecting shaft 3010, The winding gear 3503 meshes with one side of a handle gear 3505 via a reduction gear 3504.

The opposite side of the handle gear 3505 meshes with a damper gear 3502. This damper gear 3502 prevents rapid rotation of the handle gear 3505. and thus, prevents rapid rotation of the winder 3000. As a result, the scanner 210 can be prevented from falling down suddenly under its own weight when the scanner 210 is lowered for replacement or the like or when the hand is removed from the handle gear 3505.

A handle 3500 that can be manually operated is attached to the shaft of the handle gear 3505. As the handle 3500 is rotated clockwise, the winder 3000 can rotate to wind the first wire 3101 and the second wire 3102 at the same time.

A handle lock 3501 as a lock mechanism is provided in the middle of the handle 3500. This handle lock 3501 can fix the position of the handle 3500.

The handle lock 3501 can be formed with a screw that can be inserted into a hole formed in the handle 3500, for example. The rotation of the handle 3500 can be stopped when the screw is locked, and the handle 3500 can be rotated when the screw is unlocked.

Winding Amounts of Wires and Height Variations of Shafts

Figure 6:
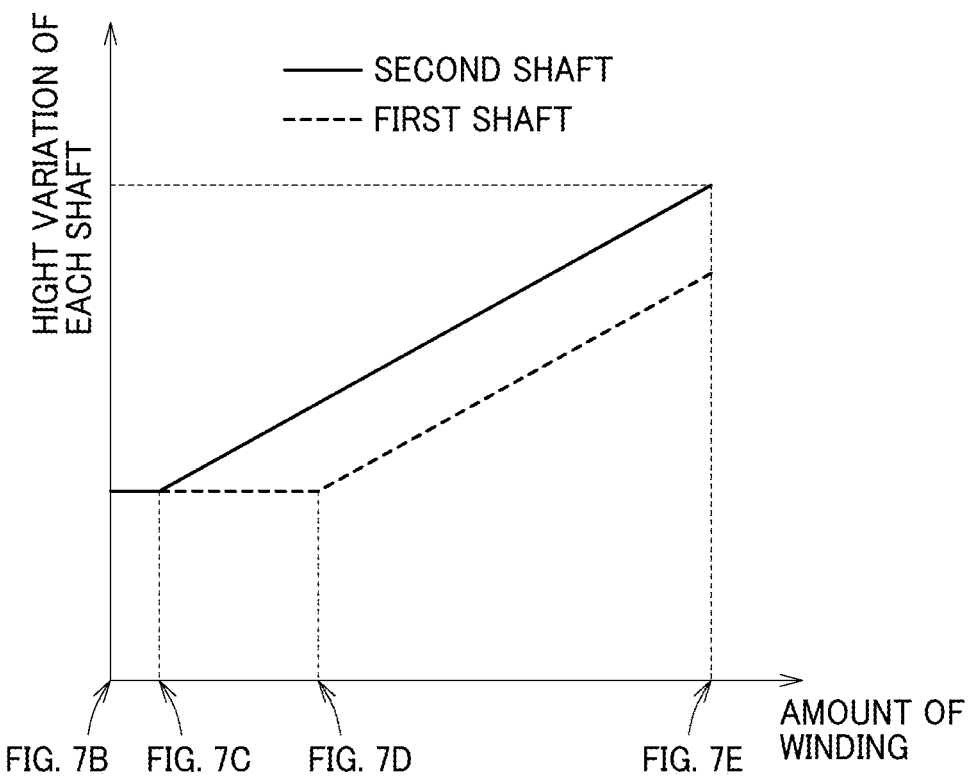
FIG. 6 is a graph illustrating the relationship between the amount of winding by a lift and the height variations of shafts.

FIG. 6 is a graph illustrating the amounts of winding (abscissa axis) of the first wire 3101 and the second wire 3102 by the winder 3000, and the variations in height of the first lifting shaft 3001 and the second lifting shaft 3002. The left end of the graph indicates the heights of the first lifting shaft 3001 and the second lifting shaft 3002 in the state illustrated in FIG. 7B.

Figure 7A:
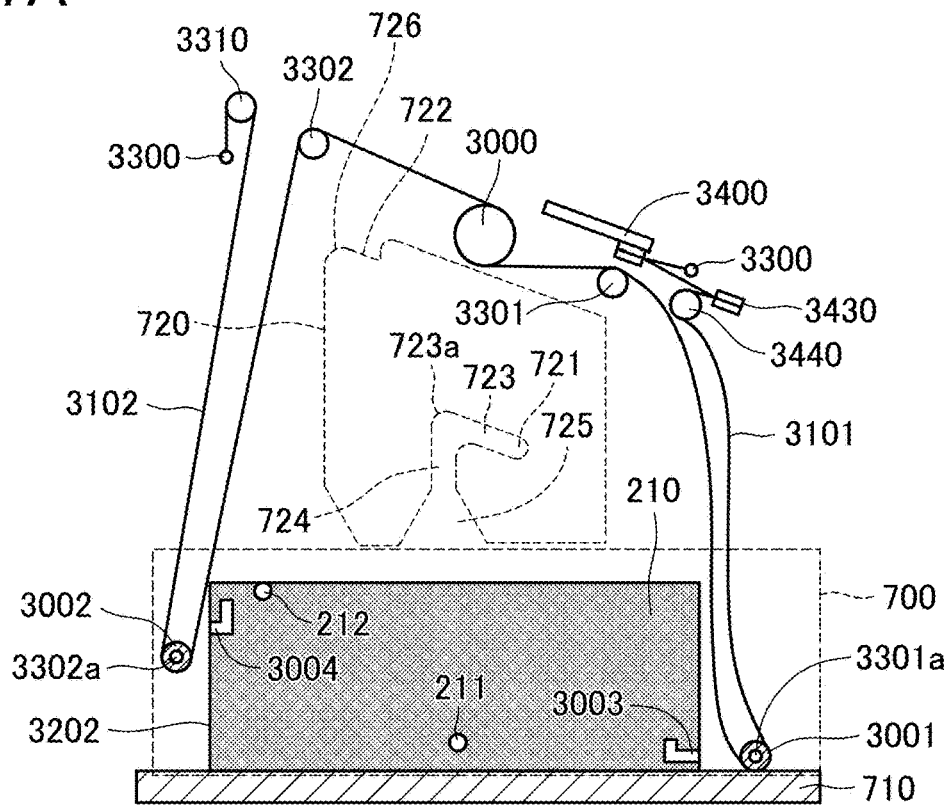
FIG. 7A is a view illustrating a process of lifting an upstream scanner.
Figure 7B:
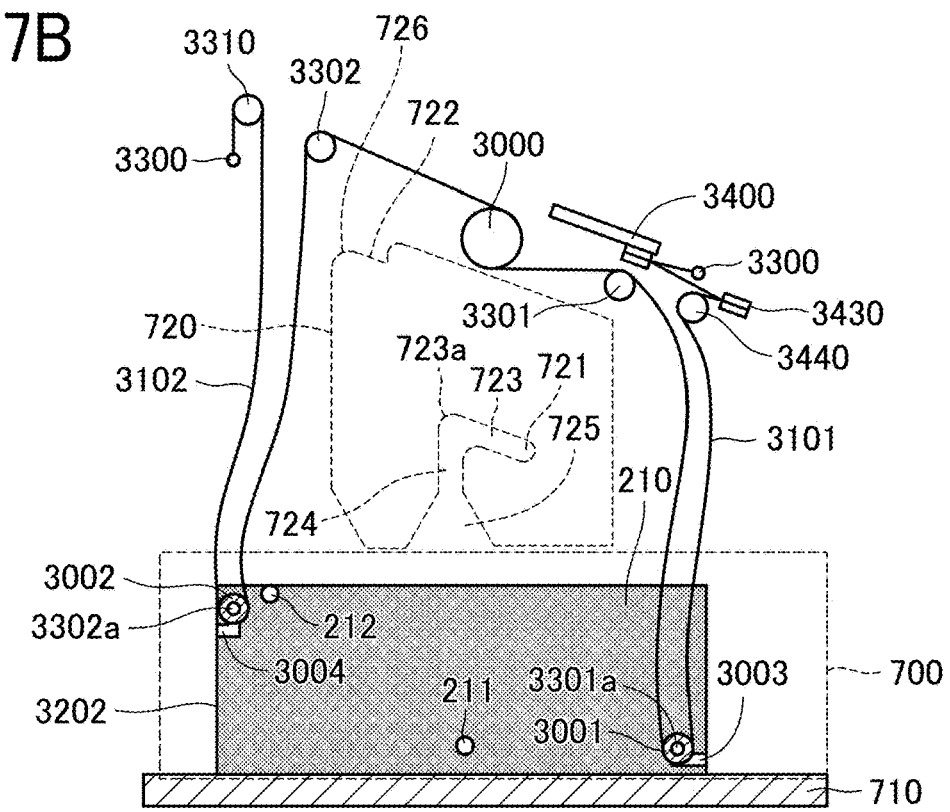
FIG. 7B is a view illustrating the process of lifting the upstream scanner.
Figure 7C:
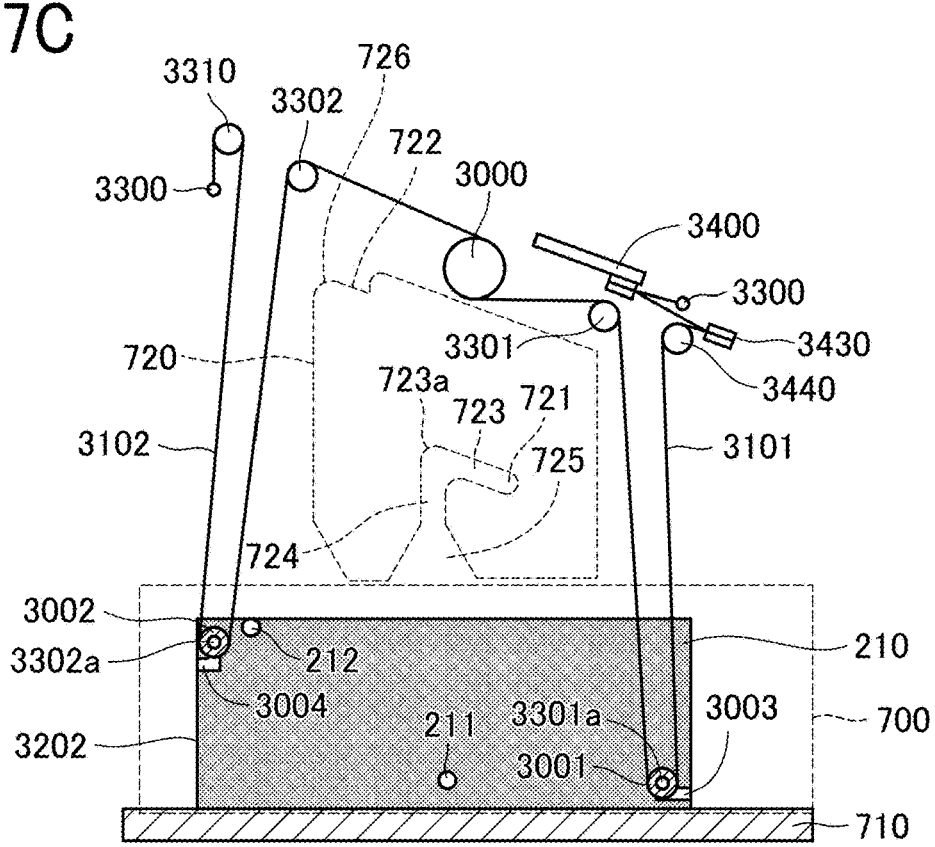
FIG. 7C is a view illustrating the process of lifting the upstream scanner.

The period from FIG. 7B to FIG. 7C is the period during which slack in the first wire 3101 and the second wire 3102 is absorbed by the winder 3000. Accordingly, the heights of the first lifting shaft 3001 and the second lifting shaft 3002 do not change.

When the slack in the first wire 3101 and the second wire 3102 is eliminated, the scanner 210 can be lifted. However, slack in the first wire 3101 is absorbed by the tensioner 3400 as described above. Therefore, in the initial stage of winding, the first lifting shaft 3001 cannot be lifted until the slack in the first wire 3101 stored in the tensioner 3400 is absorbed by the winder 3000.

Figure 7D:
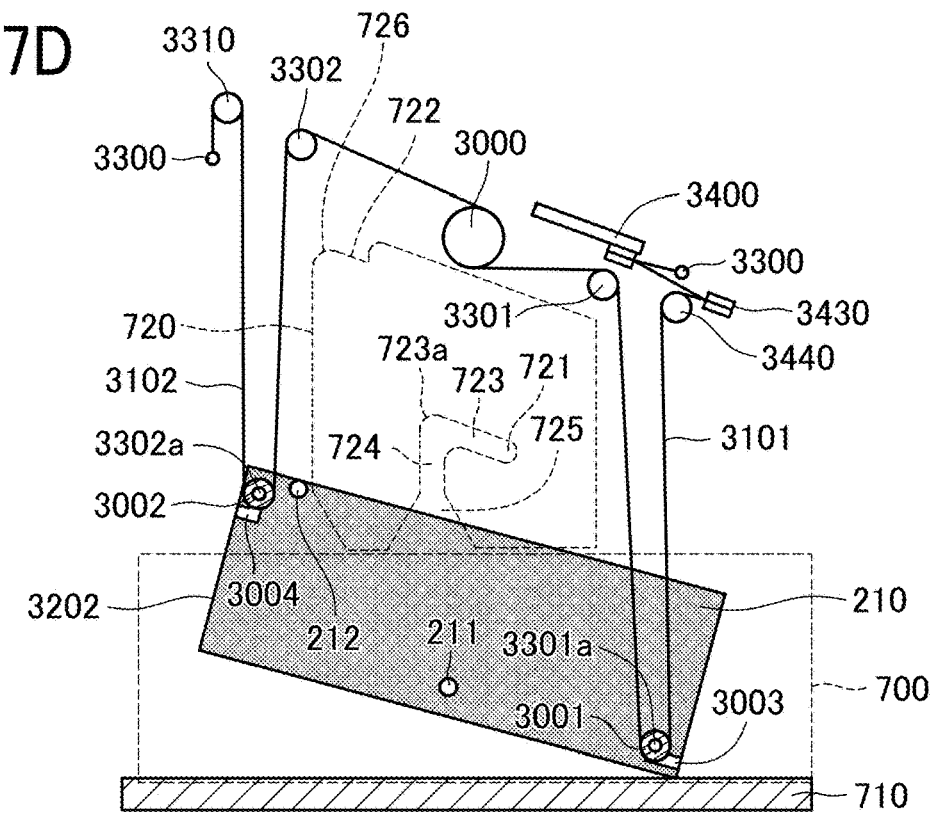
FIG. 7D is a view illustrating the process of lifting the upstream scanner.

Because of this, the second lifting shaft 3002 ascends before the first lifting shaft 3001 (FIG. 7C to FIG. 7D). After FIG. 7D, the first wire 3101 cannot be further reeled out from the tensioner 3400, and thus, the first lifting shaft 3001 and the second lifting shaft 3002 are lifted up to the heights illustrated in FIG. 7E at the same speed.

Scanner Attachment Method

In the description below, a method of attaching the scanner 210 is described, with reference to FIGS. 7A to 7F. First, the scanner 210 is carried into the access opening 700 as illustrated in FIG. 7A, and is further inserted into the back side in a horizontal direction. The introducing direction or the inserting direction of the scanner 210 is the axial direction of the rotary drum 31. At this point of time, the first lifting shaft 3001 and the second lifting shaft 3002 hang down in the access opening 700.

Next, the first lifting shaft 3001 and the second lifting shaft 3002 are engaged with the cutout grooves 3003 and 3004 of the scanner 210, as illustrated in FIG. 7B. At this point of time, the first lifting shaft 3001 and the second lifting shaft 3002 hang down in the access opening 700. Accordingly, the first lifting shaft 3001 and the second lifting shall 3002 can be easily engaged with the scanner 210.

After the first lifting shaft 3001 and the second lifting shaft 3002 are engaged in this manner, the winder 3000 is rotated as illustrated in FIG. 7C. As a result, the slack in the first wire 3101 and the second wire 3102 is eliminated. After that, the winder 3000 is further rotated, to wind the first wire 3101 and the second wire 3102 around the winder 3000, as illustrated in FIG. 7D.

In the initial stage of this winding step, the tensioner 3400 stands at a right angle as indicated by a dot-and-dash line in FIG. 4A, and there is a margin in the winding length of the first wire 3101 accordingly. Therefore, at the initial stage of winding, only the left side of the scanner 210 is lifted by the second lifting shaft 3002, and the right side of the scanner 210 remains in contact with the bottom surface 710 of the access opening 700. In this manner, a predetermined amount of wire winding is consumed in the movable range (about 90 degrees) of the tensioner 3400, so that the right side of the scanner 210 can be prevented from being lifted as illustrated in FIG. 7D.

When the first wire 3101 and the second wire 3102 are further wound by the winder 3000 from the state illustrated in FIG. 7D, the tensioner 3400 rotationally moves clockwise in spite of the tension spring 3401 as indicated by a solid line in FIG. 4A. When the first protrusion 3400a of the tensioner 3400 comes into contact with the inside surface 720b of the front guide side plate 720, the tensioner 3400 cannot further rotationally move clockwise.

Accordingly, when the first wire 3101 and the second wire 3102 are wound by the winder 3000 thereafter, the first lifting shaft 3001 and the second lifting shaft 3002 ascend at the same time, and not only the left side of the scanner 210 but also the right side of the scanner 210 are lifted. Thus, from FIG. 7D to FIG. 7E, the scanner 210 ascends (translates) while maintaining its predetermined tilt angle. During the ascent of the scanner 210, the engaged pins 211 are guided by the tapered grooves 725, and are smoothly introduced into the vertical grooves 724.

Figure 7E:
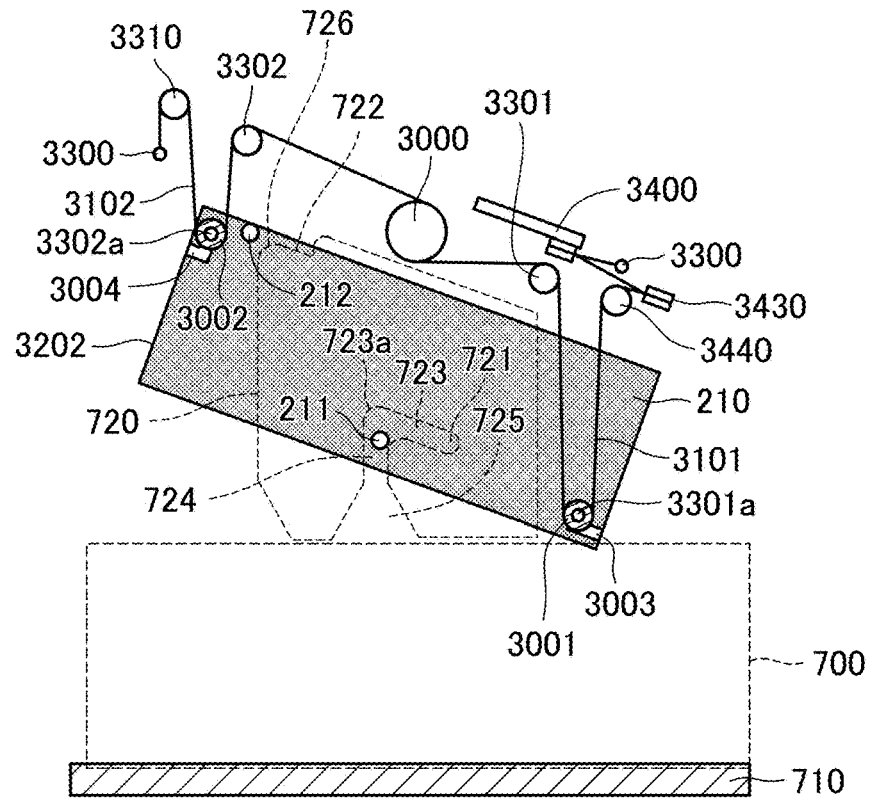
FIG. 7E is a view illustrating the process of lifting the upstream scanner.

FIG. 7E illustrates a state in which the first lifting shaft 3001 and the second lifting shaft 3002 are raised to the maximum height. When the maximum height is exceeded, the engaged pins 211 of the scanner 210 come into contact with bent portions 723a between the sloped grooves 723 and the vertical grooves 724. Therefore, the rotation stop position of the handle 3500 can be easily sensed from the feeling of contact of the handle 3500 rotating the At the height position in FIG. 7E, the handle 3500 that rotates the winder 3000, and the tensioner 3400 are locked. The handle 3500 is locked with the handle lock 3501 illustrated in FIG. 5. The tensioner 3400 is locked with the tensioner lock 3402.

Figure 7F:
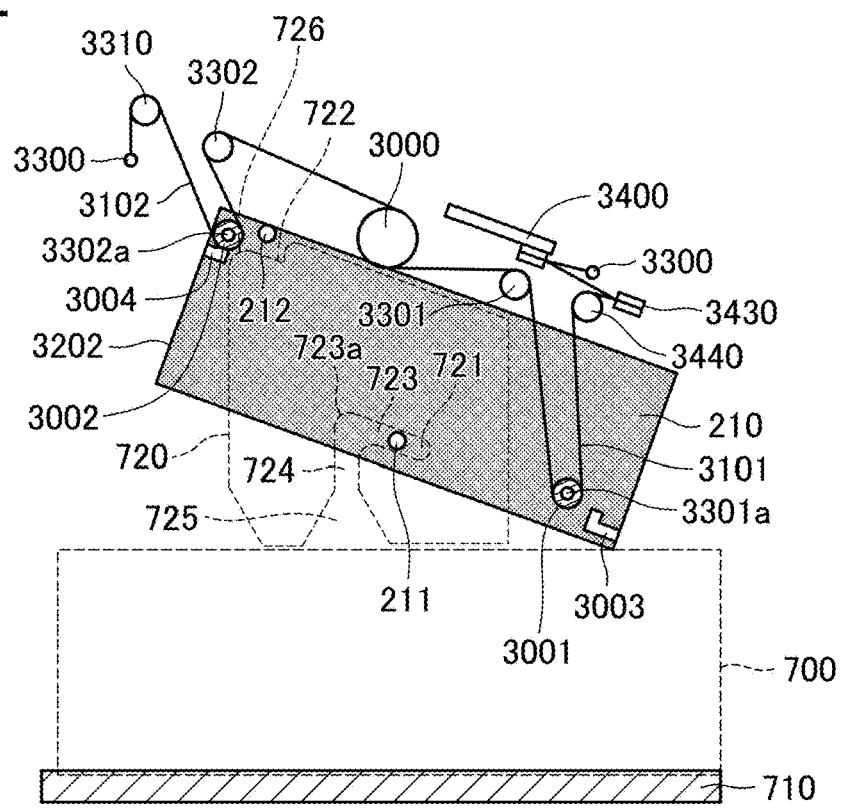
FIG. 7F is a view illustrating the process of lifting the upstream scanner.

In this locked state, the scanner 210 is moved rightward as in FIG. 7E to FIG. 7F, to engage the engaged pins 211 and 212 with the cutout portions 721 and 722. Since the scanner 210 is located close to the access opening 700, lateral movement as in FIG. 7E to FIG. 7F is easy.

During this lateral movement, the engaged pins 211 and 212 can slide obliquely downward along the sloped grooves 723 and the sloped portions 726, under the weight of the scanner 210. Accordingly, the engaged pins 211 and 212 can be easily engaged with the cutout portions 721 and 722.

After the scanner 210 is laterally moved, a check is made to determine whether there is rattling between the engaged pins 211 and 212 and the cutout portions 721 and 722. If there is rattling, the winder 3000 is reversely rotated as appropriate. The stability of the scanner 210 is confirmed in this manner, and the attachment of the scanner 210 is completed.

The attachment of the scanner 220 on the downstream side in the sheet conveying direction of the scanner 210 can be performed after the attachment of the scanner 210 is completed. That is, the downstream scanner 220 is inserted to the front side in a horizontal direction through the access opening 700 in FIG. 7F. In a case where the scanners 210 and 220 are removed, a process that is the reverse of the above-described. process is performed. Thus, according to an embodiment of the present disclosure, a plurality of readers such as the scanners 210 and 220 can be easily replaced through one access opening.

Although some embodiments of the present disclosure has been described so far, the present disclosure is not limited to the above-described embodiments, and various modifications can also be made thereto. In the present specification, the liquids to be discharged from the droplet discharge units 33A to 33D are not limited to any particular kind, as long as the liquids have viscosity and surface tension so that the liquids can be discharged from heads. However, the viscosity is preferably 30 MPa·s or lower at normal temperature and normal pressure, or by heating or cooling. Examples of the liquids include a solution, a suspension, or an emulsion that contains a solvent such as water and an organic solvent, a colorant such as dye and pigment, a functional material such as a polymerizable compound, a resin, and a surfactant, a biocompatible material such as deoxyribonucleic acid (DNA), amino acid, protein, and calcium, or an edible material such as a natural colorant, for example. Such a solution, a suspension, and an emulsion are used for inkjet ink, a surface treatment solution, a liquid for forming components of an electronic element and a light-emitting element or a resist pattern of an electronic circuit, or a material solution for three-dimensional fabrication, for example.

Examples of the energy source that generates the energy for discharging liquids include piezoelectric actuators (stacked piezoelectric elements and thin-film piezoelectric elements), thermal actuators that use thermoelectric conversion elements such as heating resistors, and electrostatic actuators each including a diaphragm and opposed electrodes. Examples of the "liquid discharge apparatus" include not only apparatuses capable of discharging a liquid to a material to which a liquid can adhere, but also apparatuses that discharges a liquid into a gas or into a liquid.

The "liquid discharge apparatus" may include means relating to feeding, conveyance, and sheet ejection of a material to which a liquid can adhere, and also include a pretreatment device and a posttreatment device. For example, the "liquid discharge apparatus" may be an image forming apparatus that forms an image on a sheet by discharging ink, or a three-dimensional apparatus that discharges a molding liquid to a powder layer in which powder material is formed in layers, so as to form a three-dimensional article.

The "liquid discharge apparatus" is not necessarily an apparatus that discharges a liquid to visualize meaningful images, such as letters or figures. For example, the "liquid discharge apparatus" may be an apparatus that forms meaningless images such as meaningless patterns, or an apparatus that fabricates three-dimensional images.

The above "material to which a liquid can adhere" means a material to which a liquid can adhere at least temporarily, a material to which a liquid adheres and is fixed, or a material into which a liquid adheres and permeates. Specific examples of the "material to which a liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. Examples of the "material to which a liquid can adhere" include any material to which a liquid adheres, unless particularly specified. The above-mentioned "material to which a liquid can adhere" may be any material to which a liquid can temporarily adhere, such as paper, thread, fiber, cloth, leather, metal, plastic, glass, wood, or ceramics.

The "liquid discharge apparatus" is an apparatus in which a droplet discharge head and a material to which a liquid can adhere move relative to each other, but is not limited to this. Specific examples of such apparatuses include a serial-type apparatus that moves droplet discharge heads, a line-type apparatus that does not move droplet discharge heads, and the like. Examples of the "liquid discharge apparatus" further include a treatment liquid applying apparatus that discharges a treatment liquid to a sheet to apply the treatment liquid onto a sheet surface so as to reform the sheet surface, and an injection granulation apparatus in which a composition liquid including raw materials dispersed in a solution is discharged through nozzles to granulate fine particles of the raw materials. The terms "image formation", "recording", "printing", "image printing", and "fabricating" used herein can be used synonymously with each other.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An image reading device, comprising:
    a plurality of readers configured to read an image on a recording medium, the plurality of readers being arranged around a carrier to rotate while carrying the recording medium on a peripheral surface of the carrier, the plurality of readers being arranged radially about a rotation axis of the carrier;
    an access opening through which the plurality of readers are to be introduced; and
    a lift including a cable configured to lift one reader of the plurality of readers introduced through the access opening, the lift being configured to lift and locate the one reader at a predetermined height position around the carrier with the cable.

2. The image reading device according to claim 1,
    wherein the cable includes:
        a first cable portion having a first shaft to engage with one end of the one reader; and
        a second cable portion having a second shaft to engage with another end of the one reader, said another end being farther from the carrier than the one end is.

3. The image reading device according to claim 2,
    wherein the first cable portion and the second cable portion are arranged in a pair with respect to an axial direction of the carrier.

4. The image reading device according to claim 3, further comprising a winder configured to wind the first cable portion and the second cable portion.

5. The image reading device according to claim 4,
    wherein the winder is configured to wind the second cable portion earlier than the first cable portion to form a slack in the first cable portion.

6. The image reading device according to claim 5, further comprising a tensioner disposed on the first cable portion and configured to reduce an amount of the slack.

7. The image reading device according to claim 6, further comprising a restrictor,
wherein the tensioner includes an elastic member configured to reduce the amount of the slack of the first cable portion,
wherein the elastic member is configured to expand such that the first shaft is not lifted by a winding operation of the winder, and
wherein when an amount of winding of the second cable portion by the winder reaches a predetermined amount, the restrictor is configured to restrict expansion of the elastic member to cause the first shaft to ascend.

8. The image reading device according to claim 7, further comprising another restrictor configured to restrict contraction of the elastic member in a direction opposite to a direction of the expansion.

9. The image reading device according to claim 1, further comprising a lock mechanism configured to lock rotation of the winder.

10. The image reading device according to claim 1, further comprising a damper mechanism configured to reduce excessive rotation of the winder.

11. A mechanism of attaching a reader in an image reading device in which a plurality of readers to read an image on a recording medium are arranged around a carrier to convey the recording medium while holding the recording medium on a peripheral surface of the carrier, the plurality of readers being arranged radially about a rotation axis of the carrier, the mechanism comprising:
an access opening through which the plurality of readers are to be introduced to set the plurality of readers at predetermined positions around the carrier; and
a lift including:
a first cable portion having a first shaft to engage with one end of one reader of the plurality of readers introduced through the access opening; and
a second cable portion having a second shaft to engage with another end of the one reader introduced through the access opening, said another end being farther from the carrier than the one end is,
the lift configured to lift and locate the one reader at a predetermined position around the carrier, with the first cable portion and the second cable portion.

12. A method of attaching a reader in an image reading device in which a plurality of readers to read an image on a recording medium are arranged around a carrier to convey the recording medium while holding the recording medium on a peripheral surface of the carrier, the plurality of readers being arranged radially about a rotation axis of the carrier, the method comprising:
introducing the plurality of readers through an access opening, to set the plurality of readers at predetermined positions around the carrier;
engaging a first shaft of a first cable portion with one end of one reader of the plurality of readers introduced through the access opening;
engaging a second shaft of a second cable portion with another end of the one reader introduced through the access opening, said another end being farther from the carrier than the one end is; and
winding the first cable portion and the second cable portion with a winder, to lift and locate the one reader at a predetermined position around the carrier.

* * * * *